United States Patent
Scheer et al.

[11] Patent Number: 6,134,996
[45] Date of Patent: Oct. 24, 2000

[54] TOOL HEAD FOR USE IN MACHINE TOOLS

[75] Inventors: Gerhard Scheer, Loechgau; Erich Feil, Neckarwestheim; Roland Hoerl, Boennigheim, all of Germany

[73] Assignee: Komet Praezisionswerkzeuge Robert Breuning GmbH, Besigheim, Germany

[21] Appl. No.: 09/180,221

[22] PCT Filed: Apr. 25, 1997

[86] PCT No.: PCT/EP97/02127

§ 371 Date: Nov. 2, 1998

§ 102(e) Date: Nov. 2, 1998

[87] PCT Pub. No.: WO97/41988

PCT Pub. Date: Nov. 13, 1997

[30] Foreign Application Priority Data

May 3, 1996 [DE] Germany .................... 196 17 899

[51] Int. Cl.[7] ..................................... B23B 3/26
[52] U.S. Cl. .............. 82/1.2; 82/72; 82/79; 82/100; 82/118; 82/119
[58] Field of Search ................. 82/1.2, 72, 79, 82/82, 88, 98, 100, 118, 119, 133, 134, 903, 905; 407/9, 10, 11, 37; 408/153, 158

[56] References Cited

U.S. PATENT DOCUMENTS

| | | | |
|---|---|---|---|
| 2,521,619 | 9/1950 | Weld | 82/1.2 |
| 3,311,003 | 3/1967 | Daugherty | 82/1.2 |
| 3,710,659 | 1/1973 | Bohner et al. . | |
| 3,824,883 | 7/1974 | Wloszek | 82/1.2 |
| 5,120,167 | 6/1992 | Simpson | 82/1.2 X |
| 5,251,511 | 10/1993 | Muendlein et al. | 82/1.2 |
| 5,388,487 | 2/1995 | Danielsen | 407/11 X |
| 5,836,727 | 11/1998 | Scheer | 408/158 |

FOREIGN PATENT DOCUMENTS

| | | |
|---|---|---|
| 1 099 308 | 7/1957 | Germany . |
| 1 193 768 | 12/1959 | Germany . |
| 20 10 200 | 9/1970 | Germany . |
| 3526712 | 1/1987 | Germany . |
| 39 18 914 | 12/1989 | Germany . |
| 284 176 | 11/1990 | Germany . |
| 43 30 822 | 3/1995 | Germany . |

*Primary Examiner*—Henry W. H. Tsai
*Attorney, Agent, or Firm*—Flynn, Thiel, Boutell & Tanis, P.C.

[57] ABSTRACT

A tool head for use in machine tools includes a base body, a tool shank adapted to be coupled to a machine spindle and protruding axially over the base body, at least one working slide adapted to be displaced essentially transversely with respect to a base body axis, and an adjusting motor disposed in the base body and acting upon the working slide in the direction of displacement by a transmission. In order to attain a compact, easily assembled, and safely operating construction, the transmission includes an output shaft aligned coaxially with respect to the axis of the base body and carrying a drive sprocket which meshes with a tooth rack on the side of the working slide. The adjusting motor also includes a driven shaft aligned with the output shaft on the transmission side. To ease assembly, the tool head is constructed of three assemblies adapted to be removably connected to each other at axial separation locations, a slide assembly which includes the working slide, a drive assembly which includes the adjusting motor and the transmission, and a connecting assembly which includes the tool shank and the power supply device.

37 Claims, 8 Drawing Sheets

FIG. 8

TOOL HEAD FOR USE IN MACHINE TOOLS

FIELD OF THE INVENTION

The invention is related to a tool head for use in machine tools, comprising a base body, a tool shank which is adapted to be coupled to a machine spindle and which protrudes axially over the base body, at least one working slide which is adapted to be displaced essentially transversely with respect to a base body axis and which has a tool holding fixture which protrudes over a front face thereof, and an electrical adjusting motor which is disposed in the base body and which acts upon the working slide in the direction of displacement by means of transmission means.

BACKGROUND OF THE INVENTION

A tool head of this type is known (DE-A-4330822), in which the adjusting motor with its essentially cylindrical motor housing is disposed in a transverse recess of the base body, which recess is aligned transversely with respect to the base body axis and intersects the base body axis, the driven shaft of the motor being aligned in parallel to the transverse recess. Transmission means are provided for driving the working slide, which comprise a gearwheel which is disposed on the driven shaft of the motor, a drive sprocket which meshes with the gearwheel, and a threaded spindle rigidly connected thereto. A sliding block having a slanted toothing is guided on the threaded spindle, which slanted toothing meshes with a complementary slanted toothing of a counterpart disposed on the slide. The transmission means are in this instance disposed eccentrically in the base body. An annular coil housing is disposed at the side of the tool shank, in which there is located a secondary coil with corresponding stabilizing electronics, which coil is part of an inductive transmission path of a power supply device for the adjusting motor and the electronic circuits which are located in the tool head. In principle, it is possible to also use the induction path also for bidirectional data transmission, wherein the data signals are modulated onto the induction current. The primary coil of the inductive transmission path is disposed in a coil housing on the machine side, which extends radially outward of the tool shank into the free space between the face of the machine spindle and the face of the coil housing on the tool head side. The centrifugal force-free arrangement of the adjusting motor and the transmission has hitherto not been adequately solved. Furthermore, the construction size and the assembly and servicing possibilities of the known tool head are not satisfactory.

Based on this, the object of the invention is to develop a tool head of the type described above, which makes an assembly and servicing friendly yet compact construction possible and ensures a vibration-free operation.

SUMMARY OF THE INVENTION

The solution according to the invention is based foremost on the idea that the transmission means comprise an output shaft which is adapted to be rotated concentrically with respect to the base body axis, which output shaft carries a drive sprocket which meshes with toothing on the side of the working slide. Advantageously, the toothing on the side of the working slide is rigidly connected to the working slide.

According to a further variant of the invention, it is provided that the toothing on the side of the working slide is disposed on an intermediate transmission element which is linearly guided in the base body and which in turn is coupled to the working slide by means of a wedge gear or an intermediate gearwheel. In this, the wedge gear may be formed by complementary, meshing slanted toothings which are disposed at the intermediate transmission element and at the working slide. With this embodiment a self-locking effect is attained and free play is avoided, which makes it possible to cut the power to the adjusting motor during each driving pause or to turn it off.

The working slide is advantageously guided in a linear guide, while the toothing is formed by a tooth rack which meshes with the drive sprocket. In order to compensate internal centrifugal forces, it is of advantage when an additional compensation slide is provided, which is disposed in the base body and which is adapted to be displaced oppositely with respect to the working slide by means of a tooth rack which meshes with the drive sprocket and which is disposed at the side of the compensation slide. In order to reduce the size of the construction, the compensation slide expediently consists at least partially of a heavy metal. On the other hand the working slide may to this end comprise at least one hollow space, wherein it may be of advantage for the unilateral compensation of free play in the region of the working slide, when at least one hollow space which is located at a distance from the tool holding fixture in the direction of displacement is filled with a heavy metal. Since the mass distribution within the tool head can only be approximately calculated beforehand, it is of advantage for attaining a precise balance, when the compensation slide carries a removable or exchangeable mass element, the mass of which is preferably adapted to be changed by removal of material.

According to a modified embodiment of the invention the working slide is formed to be a round slide which is adapted to be rotated about an axis which is parallel to the base body axis and the toothing is formed by a gearwheel which meshes with the drive sprocket. The tool holding fixture is in this case disposed eccentrically on the round slide. Since there is no mass displacement when the round slide is rotated, there is no need for a compensation slide in this arrangement.

According to a preferred embodiment of the invention the adjusting motor has a driven shaft which is aligned with the output shaft at the transmission side, and the transmission means are formed to be a reducing gear mechanism having input and output axes which are aligned to one another. This may be attained especially easily when the reducing gear mechanism is formed to be a harmonic drive transmission. In order to also attain an especially compact construction, it is proposed according to a further advantageous embodiment of the invention that the adjusting motor and the transmission means are disposed such that they radially and axially interpenetrate each other at least partially. This may be realized either in that the adjusting motor or the drive shaft thereof comprises a central opening for accepting the transmission means or that the transmission means comprise a central opening for accepting the adjusting motor.

In order to achieve a high degree of positioning precision with little friction, it is of advantage, that the working slide is guided in a preferably prismatic anti-friction guide which is fixed in the base body and which is free from play. The anti-friction guide is subject to a stress and bending moment by the cutting forces acting thereon in spite of a pretension. It is of advantage, for the anti-friction guide to be elastically deformable and for a slideway for the working slide to become active upon reaching the limit of elastic deformability. By this an improvement of the damping behavior is attained even when high momentary loads occur. Furthermore, it is ensured that no permanent deformations are formed on the guide rollers and the slide.

In principle it is possible to also guide the compensation slide in an anti-friction guide which is fixed in the base body.

In order to increase the adjusting precision, it is of advantage, to fashion the interaction of the working slide and the drive sprocket such that it is without free play. In order to attain this, it is proposed according to the invention that the tooth rack which is fixed to the working slide or the drive sprocket is divided into two axially separated toothed parts which are adapted to be displaced or rotated with respect to each other and which are adapted to be rigidly coupled to each other.

In the case of the working slide which is adapted to be displaced along a linear guide, it has proven to be especially advantageous for constructional and energetic reasons, when the working slide and a leg which is formed thereon and which carries the corresponding tooth rack have an essentially L-shaped profile, and when also the compensation slide and a leg which is formed thereon and which carries the corresponding tooth rack have an essentially L-shaped profile. The profile legs of the working slide and of the compensation slide which carry the tooth racks are expediently aligned in parallel to one another and are disposed at opposing sides of the drive sprocket.

In order to attain a high degree of assembling and servicing ease, it is proposed according to an alternative or preferred embodiment of the invention that the base body is divided into a slide assembly for accepting the working slide and possibly the compensation slide, a drive assembly for accepting the adjusting motor and the transmission means, and a connecting assembly comprising the tool shank, which are removably connected to each other at axial separation locations. In this, the slide assembly expediently comprises a measuring device which is adapted to directly measure the displacement of the working slide with respect to the base body. Further, the slide assembly and/or the drive assembly comprise measuring and control electronics which are connected to the measuring device and serve to control the adjusting motor. The connecting assembly comprise an interface for an inductive power supply or data transmission, while the base body may comprises an interface for a galvanic power supply and data transmission, which interface is preferably located in the region of the slide assembly.

A preferred embodiment of the invention provides that the working slide and the compensation slide are disposed at an axial distance from one another under formation of a free space, and that the tooth racks of the working slide and the compensation slide, as well as the drive sprocket which is disposed on the free end of the output shaft, extend into the free space. In order to make this possible the compensation slide expediently comprises an elongated hole for the through passage of the output shaft. In order to be able to transmit the forces acting on the drive sprocket to the base body without any loss of adjusting precision, it is of advantage, that the drive assembly extends into an axially open recess of the slide assembly with an axially protruding bearing sleeve for the output shaft. In this, the bearing sleeve expediently extends through the elongated hole of the compensation slide.

A further preferred or alternative embodiment of the invention provides that the adjusting motor engages with a rotationally symmetric motor housing a recess of the base body, which recess is concentric with respect to the base body axis and which may comprise a gap space which is delimited by the motor housing, which is fluid tight, and which is adapted to be subjected to a coolant for cooling the motor. That part of the recess which comprises the gap space is expediently located in the connecting assembly. Since thermal energy must also be dissipated from the region of the interface for the power supply and data transmission, it is of advantage that the power supply and data transmission interface are disposed in a housing part of the connecting assembly, the outer side of which is adapted to be subjected over a broad surface area to a coolant flow.

In order to supply the tool holding fixture with a coolant and lubricant, the working slide may have a radial bore for the connection to a coolant conduit in the base body, which bore communicates with the tool holding fixture and is aligned parallel to the direction of displacement. To this end, the coolant conduit in the base body comprises a pipe which slidably and sealingly engages the radial bore.

In order to protect the slide assembly from dirt and the coolant and lubricant, it comprises a jacket tube which is braced to the base body by means of a cover part, such that it cannot be rotated or displaced.

The tool head according to the invention is advantageously used as a facing head or bore head.

BRIEF DESCRIPTION OF THE DRAWINGS

In the following the invention will be described in greater detail with reference to an embodiment schematically shown in the drawing, in which.

DETAILED DESCRIPTION OF THE INVENTION

The tool head shown in the drawing is intended to be used as a facing head in machine tools. The tool head essentially consists of a base body 10 which is adapted to be rotated about an axis of rotation 12, a working slide 16 which is adapted to be displaced within the base body 10 transversely with respect to the axis 12 and which carries a tool holding fixture 14 for a cutting tool, a compensation slide 18 (only FIGS. 1 to 6) which is adapted to be displaced within the base body 10 in a direction opposite to that of the working slide 16, a measuring device 20 for directly measuring the displacement path of the working slide 16 with respect to the base body 10, an electric adjusting motor 24 which acts on the working slide 16 and the compensation slide 18 by way of an interposed reducing gear mechanism 22, a power supply device 26, and a tool shank 28 which protrudes axially over the base body 10 and which is adapted to be coupled to a machine spindle (not shown) of a machine tool.

The tool head is constructed of three assemblies which are adapted to be removably coupled to each other at axial separation locations 30, 32, a slide assembly 34 which contains the working slide 16 and the compensation slide 18, a drive assembly 36 which contains the adjusting motor 24 and the reducing gear mechanism 22, and a connecting assembly 38 which contains the tool shank 28 and the power supply device 26. The slide assembly 34 is surrounded at its circumference by a jacket 40 made of metal or plastic and is closed off at its face side by a cover part 42. The joining of the slide assembly 34 and the drive assembly 36 is achieved by means of axially parallel bolts 44 which are screwed into threaded bores 46 of the drive assembly 36 and pass through the cover part 42 and openings (not shown) in the slide assembly 34. The connecting assembly 38 is bolted to the drive assembly 36 from the opposing face side by means of bolts 48.

Figure 1:
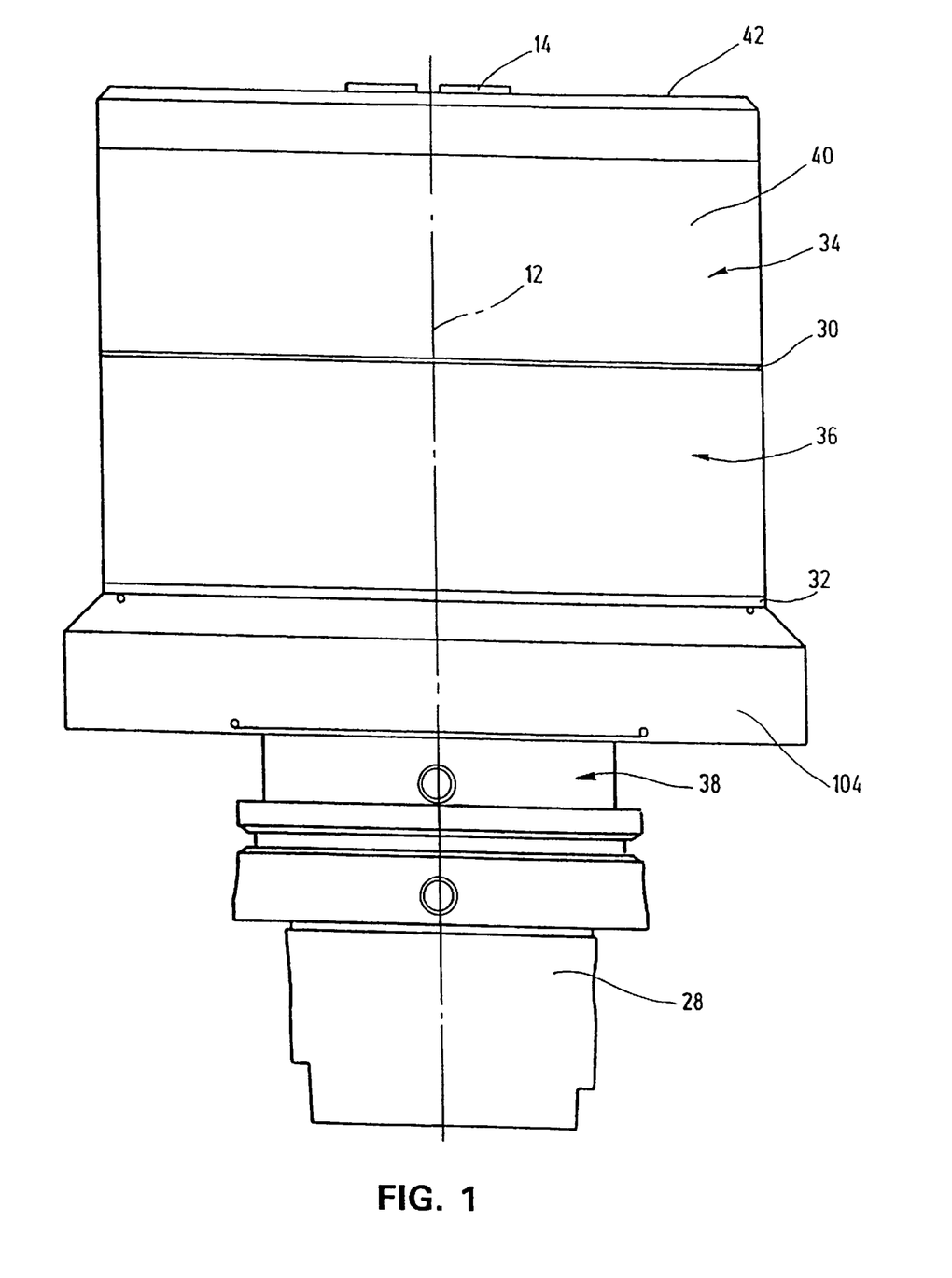
FIG. 1 shows a side view of a tool head designed to be a facing head.
Figure 2:
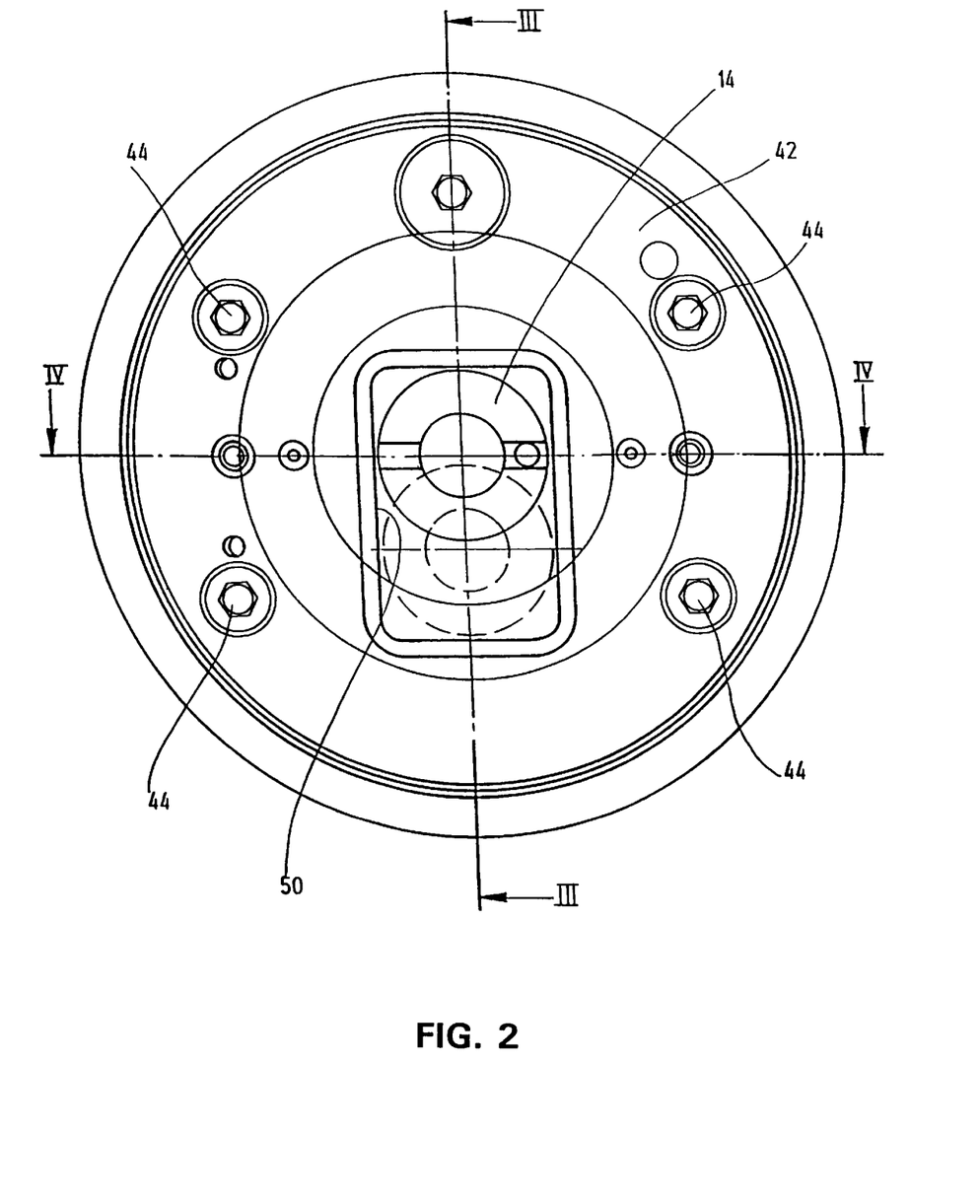
FIG. 2 shows a plan view of the tool head according to FIG. 1.
Figure 3:
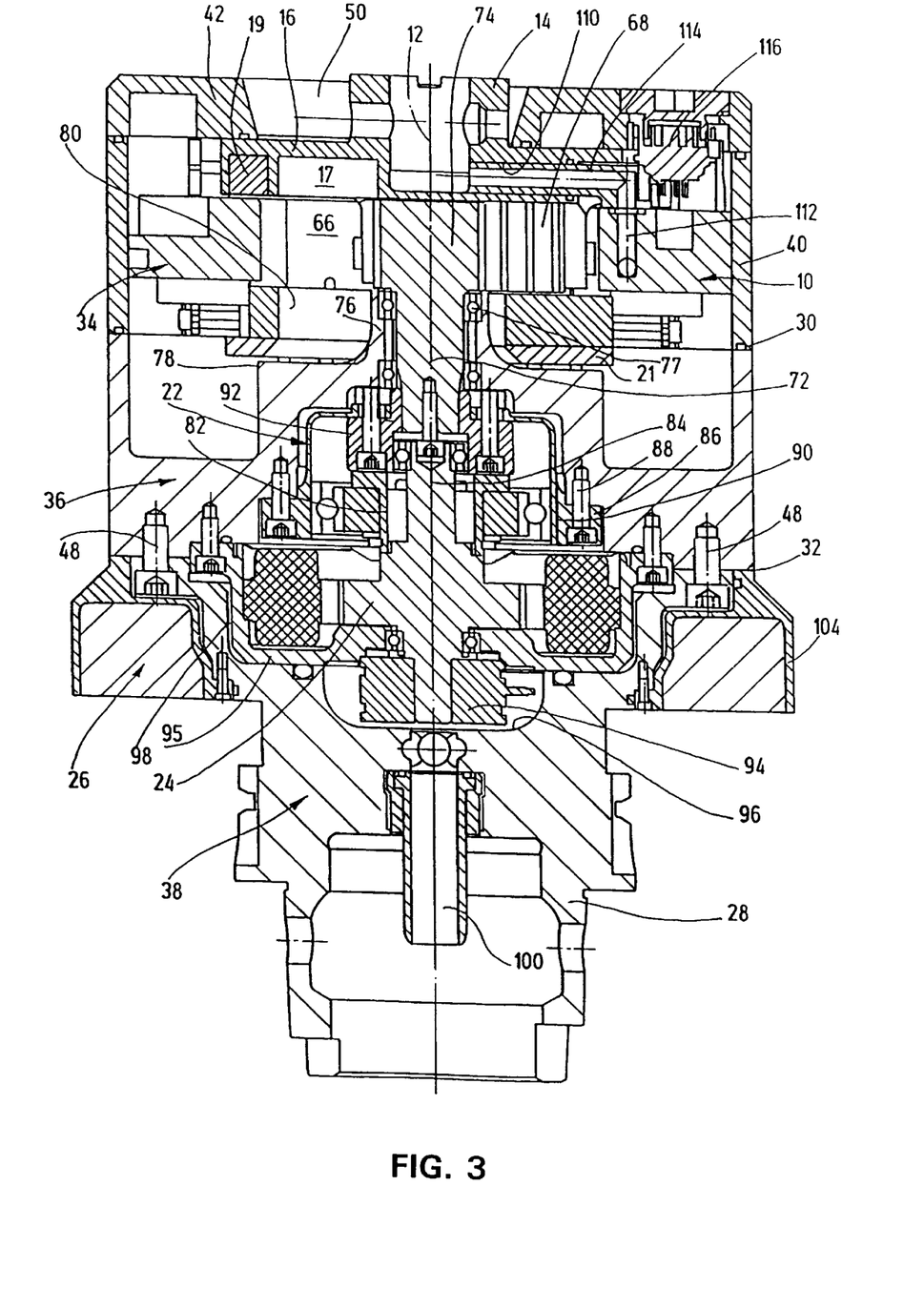
FIG. 3 shows a section along the line III—III in FIG. 2.

The working slide 16 which extends with the tool holding fixture 14 through an elongated hole 50 in the cover part 42 is guided in the direction of displacement in a prismatic anti-friction guide 52 which is fixed in the base body 10. The anti-friction guide is made free from play by means of clamping wedges (not shown) which press against the guide prisms 54 which are fixed to the base body. Since the anti-friction guide 52 is subjected to a moment load through the tool holding fixture 14 upon the occurrence of high cutting forces, which may lead to a deformation, a slideway 56 for the working slide 16 which becomes active upon reaching the limit of elastic deformability is additionally provided. In the unstressed state a free space 58 is formed in front of the slideway 56, into which the guide prism 54 which is fixed to the working slide 16 may elastically bend under stress, until it comes into contact with the slideway 56. The slideway ensures that the tool is dampened during heavy cutting and that chattering or vibrations are thus avoided. The working slide 16 is provided with hollow spaces 17 at one of its broad sides. FIG. 3 shows that the hollow space which is located furthest from the tool holding fixture as seen in the direction of displacement is filled with a heavy metal 19.

The compensation slide 18 which preferably is made of a heavy metal is also guided in an anti-friction guide 60 which is fixed in the base body and which does not have to be free from play. On its one broad side the compensation slide 18 is fitted with a removable or exchangeable plate-shaped mass element 21, the mass of which can be adjusted by removal of material.

The working slide 16 and the compensation slide 18 are disposed at an axial distance from one another. As can be seen especially in FIG. 4, they have an essentially L-shaped profile, wherein tooth racks 68, 70 are disposed on the short legs 67, 69 which extend into the region of the spacing 66, which tooth racks mesh with a drive sprocket 74 which is disposed on the output shaft 72 of the reducing gear mechanism 22 which is coaxial with respect to the axis of rotation 12. In this manner the working slide 16 and the compensation slide 18 are displaced in opposite directions upon rotation of the drive sprocket 74.

The output shaft 72 is borne in a bearing sleeve 76 which axially protrudes over the drive assembly 36 by means of two roller bearings 77. It extends together with the bearing sleeve 76 through an opening 78 in the slide assembly 34 and through an elongated hole 80 in the compensation slide 18 from the side of the drive assembly 36.

The reducing gear mechanism 22 is a harmonic drive transmission, the oval drive plate 82 of which is coupled to the driven shaft 84 of the adjusting motor 24 which is coaxial with respect to the axis of rotation 12, the internally toothed ring 86 of which is connected to the base body 10 in the region of the drive assembly 36 by means of bolts 88 such that it cannot be rotated, and the externally toothed flexible sleeve 90 of which is coupled to the output shaft 72 by means of the coupling part 92.

Figure 4:
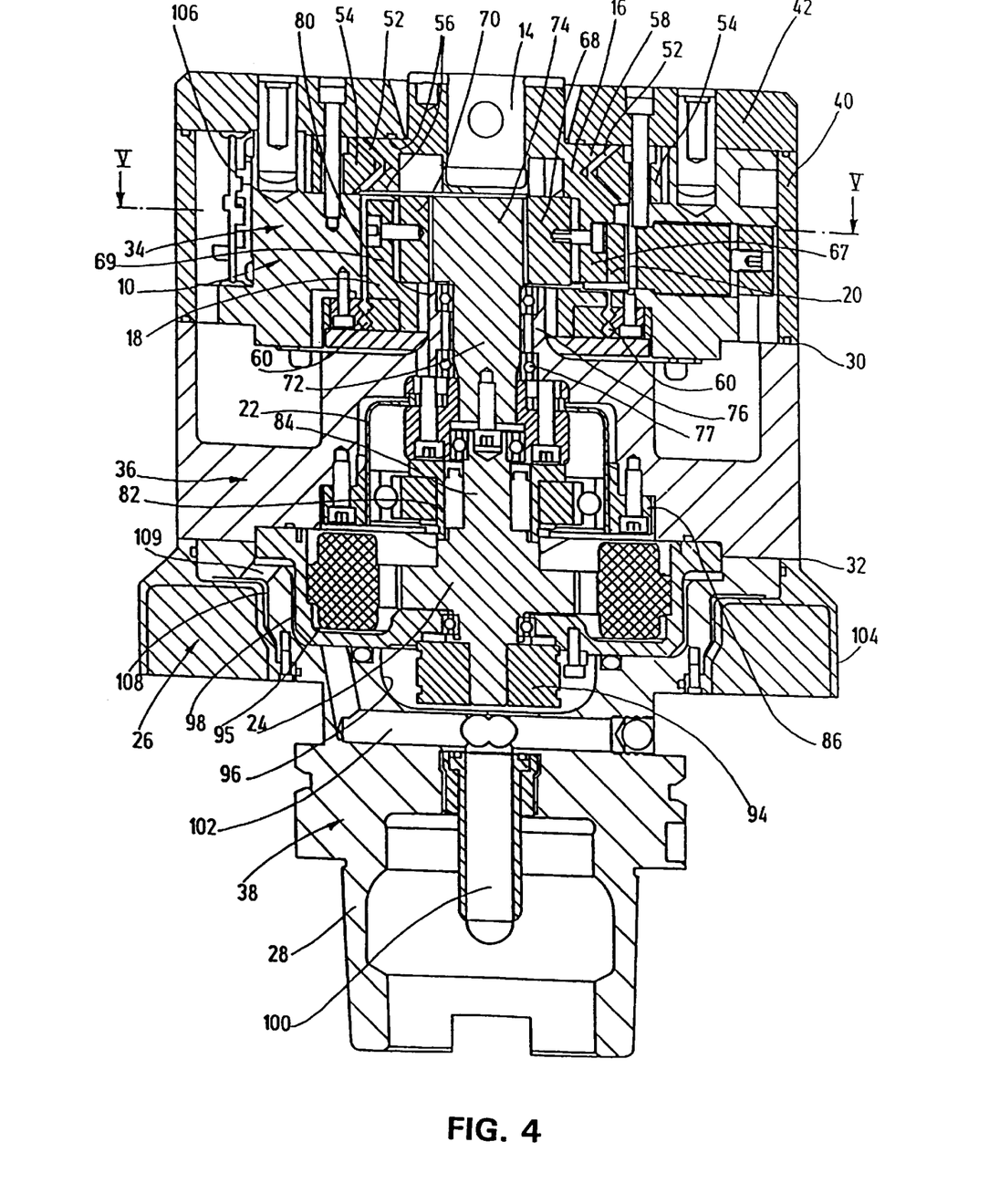
FIG. 4 shows a section along the line IV—IV in FIG. 2.
Figure 5:
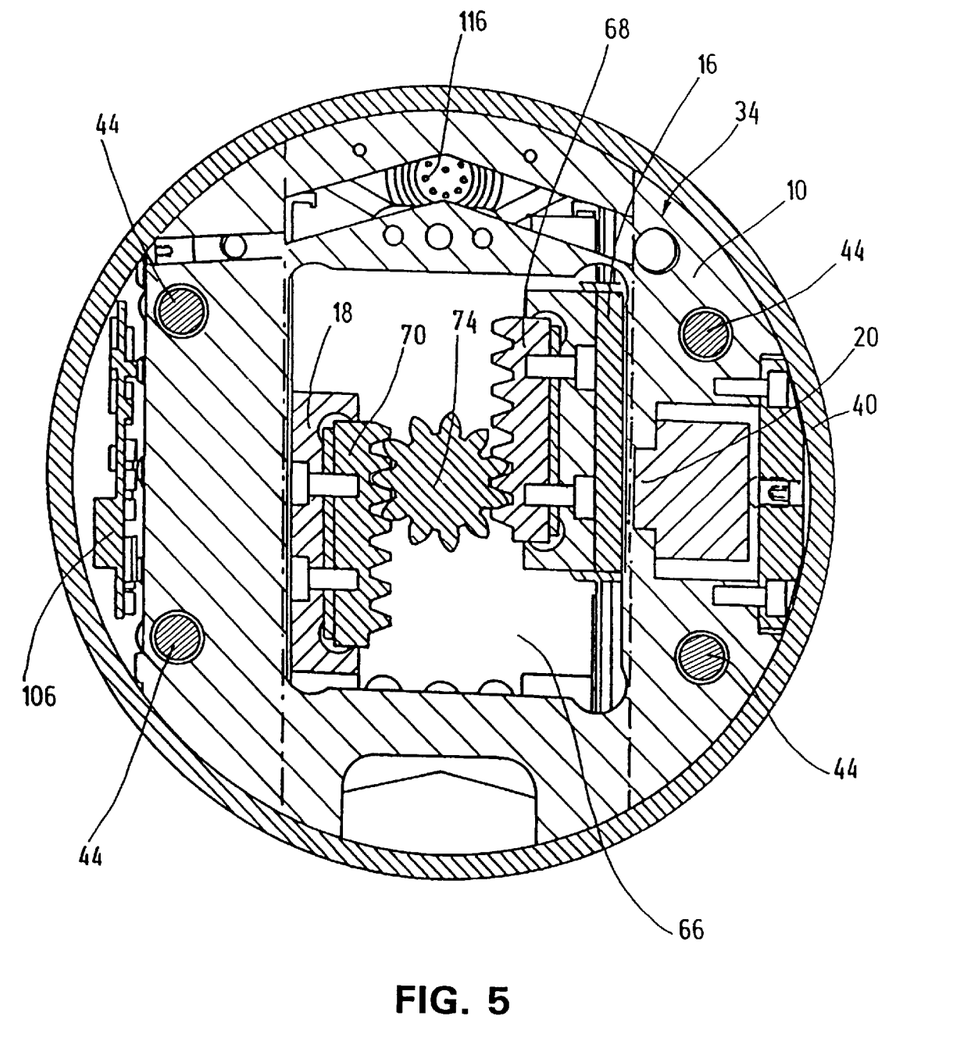
FIG. 5 shows a section along the line V—V in FIG. 4.
Figure 6:
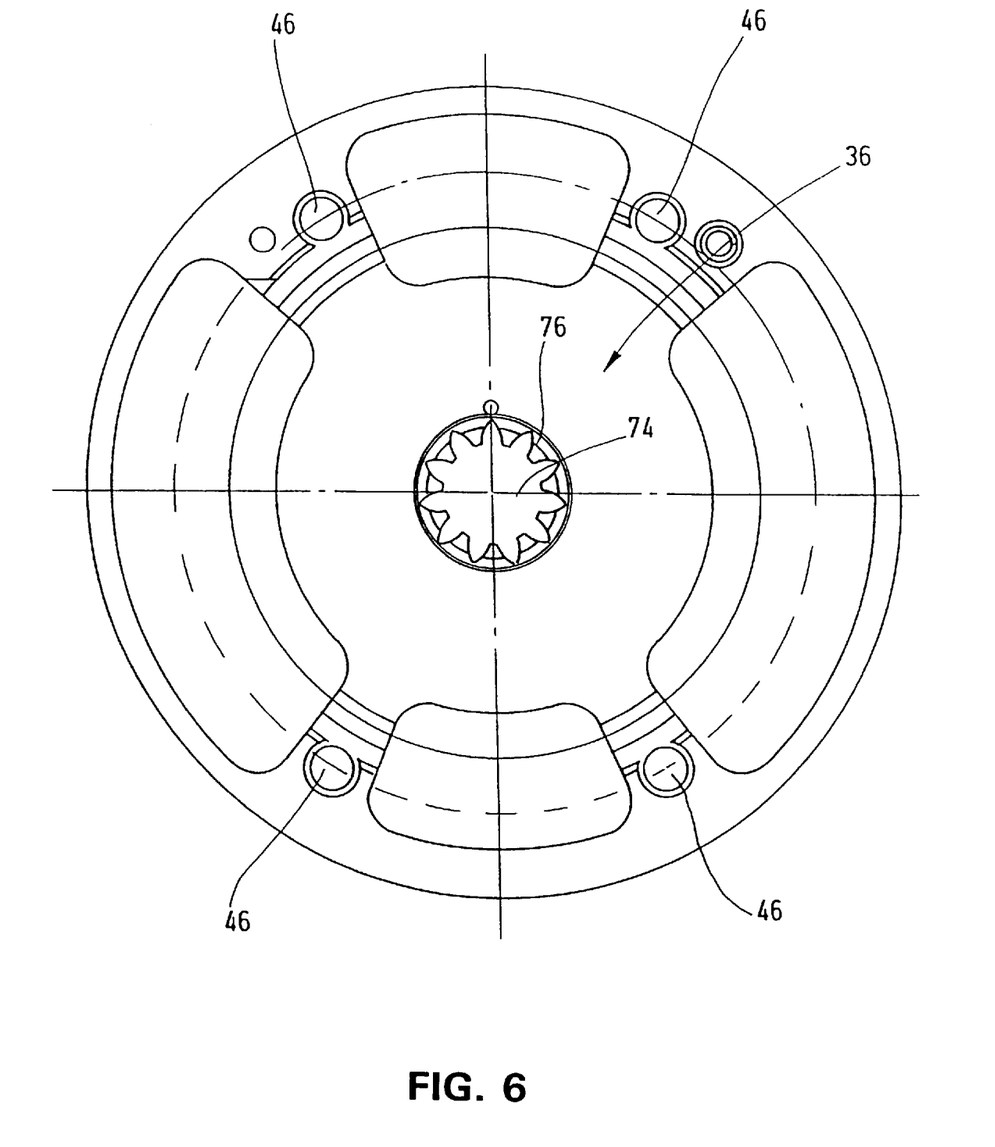
FIG. 6 shows a plan view of the driving assembly of the tool head with the slide assembly being removed.

The adjusting motor 24 which is schematically shown in FIGS. 3 and 4 and which is fitted with an encoder 94 axially protrudes over the drive assembly 36 with its motor housing 95 and extends there into a cylindrical recess 96 in the connecting assembly 38, which recess is concentric with respect to the axis of rotation 12, leaving free a gap space 98. The gap space 98 communicates with the conduits 100, 102 of the connecting assembly 38 and can be subjected through these with a coolant by way of the machine tool. In this manner the heat generated during the operation of the adjusting motor may be dissipated.

The power supply device 26 comprises a coil housing 104 which is disposed on the connecting assembly 38, in which a secondary coil with corresponding stabilizing electronics which is embedded in a mechanically tough casting material consisting of resin or synthetic material is disposed.

The secondary coil is part of an inductive transmission path of the power supply device 26, which serves to supply current to the adjusting motor 24 and the electronic circuits 106 in the tool head. The inductive path further serves a bidirectional data transmission, wherein the data signals are modulated onto the induction current. The primary coil (not shown) of the power supply device 26 is disposed in a coil housing on the machine side, which extends radially outward from the tool shank 28 into a free gap between the face of a machine spindle and the face of the coil housing 104 on the tool head side on the outside of the coil housing 104 there is a gap space 108 which communicates by way of conduits 109 with the gap space 98 on the motor side and can thus be subjected to a coolant. In this manner the heat generated by the secondary coil of the power supply device 26 may be dissipated.

A fraction of the coolant and lubricant supplied through the conduits 100, 102 is led within the base body 10 to the tool holding fixture 14 and from there to a cutting tool carrier (not shown). To this end the working slide 14 comprises a radial bore 110 which is aligned in parallel to the direction of its displacement and extends up to the tool holding fixture 14, into which radial bore a pipe which communicates with the coolant conduits 112 of the base body 10 extends in a sliding and sealing manner.

An interface having a plug socket 116 for the galvanic power supply and data transmission is additionally disposed in the region of the slide assembly.

Figure 7:
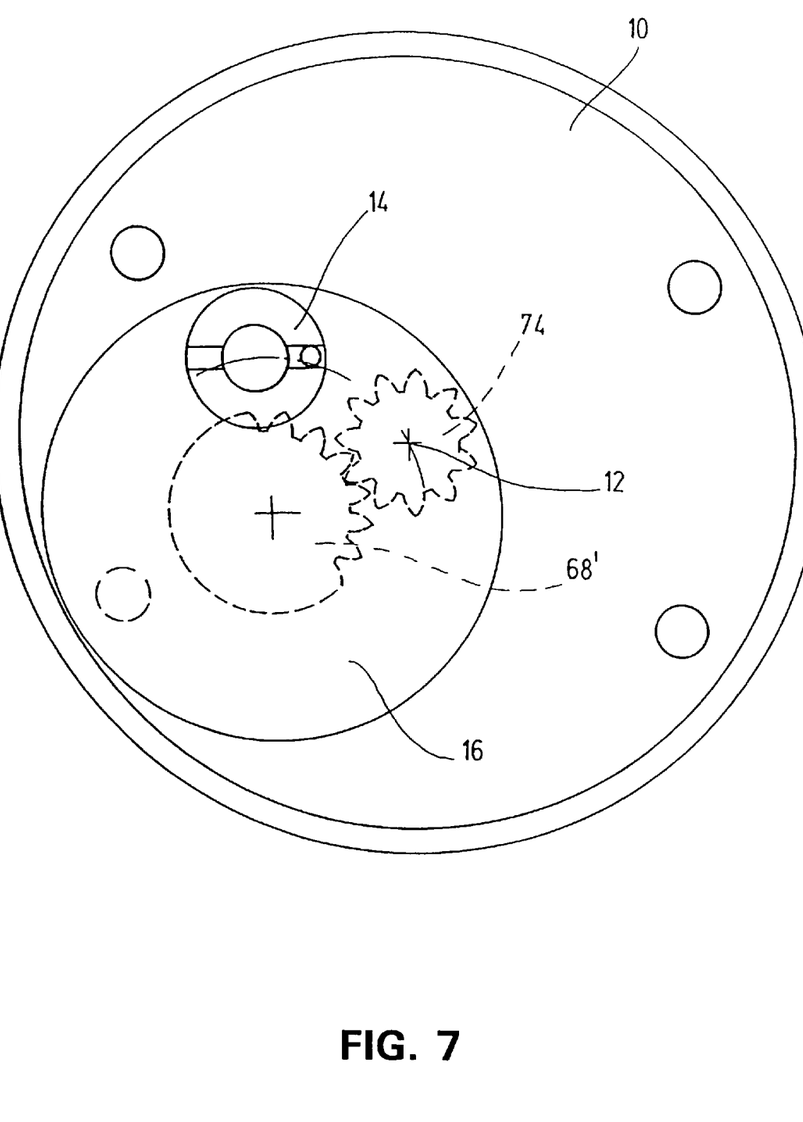
FIG. 7 shows a plan view of a facing head modified with respect to FIGS. 1 to 6, the working slide of which is designed to be a round slide.

The embodiment of a facing head as shown in plan view in FIG. 7 differs from the embodiment of FIGS. 1 to 6 in that the working slide 16 is designed to be a round slide which is eccentrically disposed on the tool head and which is adapted to be rotated by means of the drive sprocket 74 and a gearwheel 68' which is rigidly connected to the working slide, thereby effecting an essentially radial displacement of the tool holding fixture 14. The rotation of the round slide 16 causes no mass displacement, so that a compensation slide is not necessary in this instance. Due to this a significantly lower power rating of the adjusting motor 24 is sufficient.

Figure 8:
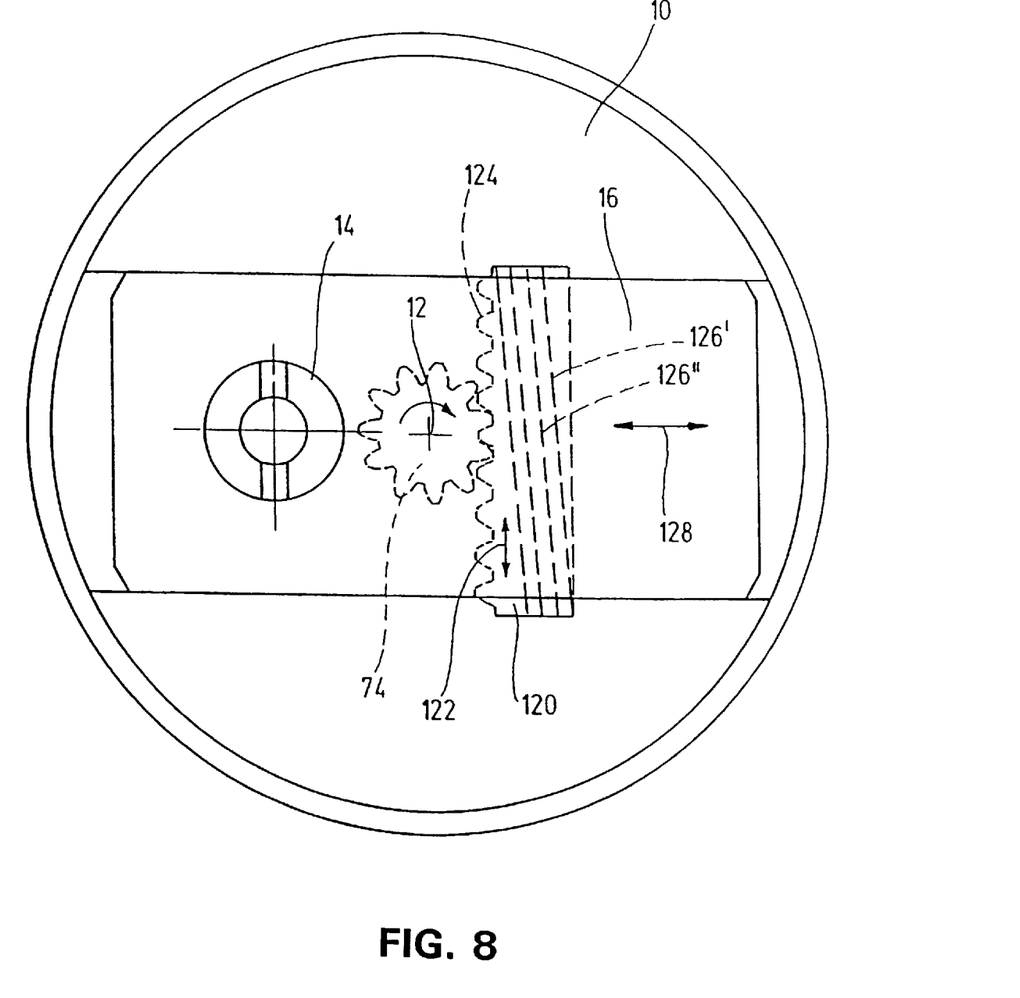
FIG. 8 shows a plan view of a modified embodiment of a facing head having an intermediate transmission element which is disposed between the drive sprocket and the working slide and which is formed to be a wedge gear mechanism.

The embodiment of a facing head as shown in plan view in FIG. 8 differs from the embodiment of FIGS. 1 to 6 in that an intermediate transmission element 120 is disposed between the drive sprocket 74 and the working slide 16 which is formed to be a linear slide, which element is linearly guided in the tool head in the directions of the double arrow 122 and which comprises a linear toothing 124 which meshes with the sprocket 74 as well as a slanted toothing 126' which is oriented toward the working slide 16 and which cooperates with a complementary slanted toothing 126" in the sense of a wedge transmission, so that the working slide is displaced in the direction of the double arrow 128, thereby radially displacing the tool holding fixture 14. The slanted toothing 126', 126" leads to an additional reduction of the displacement path of the working slide 16 and to a self-locking effect in any intermediate position. The slanted toothing 126', 126" may also be freed from play with simple means.

In summary the following is to be stated: The invention is related to a tool head for use in machine tools. The tool head comprises a base body 10, a tool shank 28 which is adapted to be coupled to a machine spindle and which protrudes axially over the base body 10, at least one working slide 16 which is adapted to be displaced essentially transversely with respect to a base body axis 12, and an adjusting motor 24 which is disposed in the base body and which acts upon the working slide 16 in the direction of displacement by means of transmission means 22, 72, 74, 68. In order to attain a compact, easily assembled, and safely operating construction, it is proposed according to the invention that the transmission means comprise an output shaft 72 which is aligned coaxially with respect to the axis of the base body, which output shaft carries a drive sprocket 74 which meshes with a tooth rack 68, 124 on the side of the working slide. A further improvement in this respect is attained when the adjusting motor 24 comprises a driven shaft 84 which is aligned with the output shaft 72 on the transmission side. In order to improve the ease of assembly, the tool head is constructed of three assemblies which are adapted to be removably connected to each other at axial separation locations 30, 32, a slide assembly which contains the working slide 16, a drive asembly 36 which contains the adjusting motor and the transmission means, and a connecting assembly 38 which contains the tool shank 28 and the power supply device 26.

What is claimed is:

1. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, an adjusting motor disposed in the base body and acting on the working slide in a direction of displacement by means of a transmission means, wherein the transmission means comprises an output shaft adapted to be rotated concentrically with respect to the base body axis, the output shaft carrying a drive sprocket disposed on a free end of the output shaft, the drive sprocket meshing with a first tooth rack disposed on a side of the working slide, and connected to the working slide, and a compensation slide disposed in the base body, the compensation slide adapted to be displaced in a direction opposed to the working slide by a second tooth rack that meshes with the drive sprocket and which is disposed on a side of the compensation slide and connected thereto, wherein the working slide and the compensation slide are disposed at an axial distance from one another under formation of a free space, and the first tooth rack of the working slide, the second tooth rack of the compensation slide and the drive sprocket extend into the free space, and wherein the compensation slide includes an elongated hole as a through passage for the output shaft.

2. The tool head of claim 1, wherein the working slide is guided in a linear guide fixed to the base body.

3. The tool head of claim 1, wherein at least part of the compensation slide comprises a heavy metal.

4. The tool head of claim 1, wherein the working slide and a slide leg formed thereon carry the second tooth rack and have an essentially L-shaped profile.

5. The tool head of claim 4, wherein the compensation slide and a compensation leg formed thereon carry the second tooth rack and have an essentially L-shaped profile.

6. The tool head of claim 5, wherein the slide leg of the working slide and the compensation leg of the compensation slide which carry the tooth racks are aligned in parallel to one another and are disposed at opposing sides of the drive sprocket.

7. The tool head of claim 1, wherein the working slide includes at least one hollow space.

8. The tool head of claim 1, wherein the at least one hollow space is spaced with respect to the tool coupling fixture in the direction of displacement and filled with a heavy metal.

9. The tool head of claim 1, wherein the compensation slide carries a removable or exchangeable mass element.

10. The tool head of claim 1, wherein the transmission means comprises a reducing gear mechanism having input and output axes which are aligned with each other, wherein the reducing gear mechanism is formed as a harmonic drive transmission or a planetary transmission.

11. The tool head of claim 10, wherein the adjusting motor and the reducing gear mechanism are disposed to radially and axially interpenetrate each other.

12. The tool head of claim 11, wherein the adjusting motor or a driven shaft thereof includes a central opening for accepting the reducing gear mechanism.

13. The tool head of claim 11, wherein the reducing gear mechanism includes a central opening for accepting the adjusting motor.

14. The tool head of claim 1, wherein the working slide is guided in a prismatic anti-friction guide fixed in the base body and free from play, the anti-friction guide being elastically deformable.

15. The tool head of claim 1, wherein the compensation slide is guided in an anti-friction guide fixed in the base body.

16. The tool head of claim 1, including a slide assembly for accepting the working slide and the compensation slide, a drive assembly for accepting the adjusting motor and the transmission means, and a connecting assembly comprising the tool shank, the slide assembly and connecting assembly being removably connected to the drive assembly at axial locations on opposing sides of the drive assembly.

17. The tool head of claim 16, wherein the slide assembly comprises a measuring device adapted to directly measure displacement of the working slide with respect to the base body.

18. The tool head of claim 17, wherein at least one of the slide assembly and the drive assembly comprise measuring and control electronics connected to the measuring device and controlling the adjusting motor.

19. The tool head of claim 16, wherein the connecting assembly includes an interface for an inductive power supply and data transmission.

20. The tool head of claim 19, wherein the power supply interface is disposed in a housing, an outer side of the housing being adapted to receive a coolant by way of a gap space.

21. The tool head of claim 16, wherein the drive assembly extends into an axially open recess of the slide assembly with an axially protruding bearing sleeve for the output shaft.

22. The tool head of claim 21, wherein the bearing sleeve extends into the elongated hole of the compensation slide.

23. The tool head of claim 16, wherein the slide assembly comprises a jacket tube braced to the base body by a cover part to prevent rotation or displacement of the jacket tube.

24. The tool head of claim 16, wherein the base body comprises an interface for a galvanic power supply and data transmission, said interface being located in the region of the slide assembly.

25. The tool head of claim 1, wherein a gap space is located in a region of a recess in the base body on an outer side of a motor housing of the adjusting motor, the gap space adapted to receive a coolant for cooling the adjusting motor.

26. The tool head of claim 25, wherein a part of the recess containing the gap space is disposed in the connecting assembly.

27. The tool head of claim 1, wherein the first tooth rack connected to the working slide is divided into two axially separated toothed parts adapted to be displaced or rotated with respect to each other and adapted to be rigidly coupled to each other.

28. The tool head of claim 1, wherein the working slide includes a radial bore for connection to a coolant conduit in the base body, the bore communicating with the tool holding fixture and aligned parallel to the direction of displacement.

29. The tool head of claim 28, wherein the coolant conduit in the base body comprises a pipe which slidably and sealingly engages the radial bore.

30. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, and an adjusting motor disposed in the base body and acting on the working slide in a direction of displacement by means of a transmission means, wherein the transmission means comprises an output shaft adapted to be rotated concentrically with respect to the base body axis, the output shaft carrying a drive sprocket which meshes with toothing on a side of the working slide, wherein the toothing on the side of the working slide is disposed on an intermediate transmission element which is linearly guided in the base body, the intermediate transmission element being coupled to the working slide by a wedge gear or an intermediate gearwheel.

31. The tool head of claim 30, wherein the wedge gear is formed by complementary, meshing slanted toothings disposed at the intermediate transmission element and at the working slide.

32. The tool head of claim 30, wherein a compensation slide is disposed in the base body and adapted to be displaced oppositely with respect to the working slide by a tooth rack which meshes with the drive sprocket and is disposed at the side of the compensation slide and fixed thereto.

33. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, an adjusting motor disposed in the base body and acting on the working slide in a direction of displacement by means of a transmission means, wherein the transmission means comprises an output shaft adapted to be rotated concentrically with respect to the base body axis, the output shaft carrying a drive sprocket which meshes with a tooth rack disposed on a side of the working slide and connected to the working slide, wherein the working slide is formed as a round slide adapted to be rotated about an axis parallel to the base body axis, and the tooth rack is part of a gearwheel which meshes with the drive sprocket.

34. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, an adjusting motor disposed in the base body and acting on the working slide in a direction of displacement by means of a transmission means, wherein the transmission means comprises an output shaft adapted to be rotated concentrically with respect to the base body axis, the output shaft carrying a drive sprocket which meshes with a tooth rack disposed on a side of the working slide an connected to the working slide, and wherein the transmission means comprises a reducing gear mechanism having input and output axes which are aligned with each other, wherein the reducing gear mechanism is formed as a harmonic drive transmission or a planetary transmission.

35. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, an adjusting motor disposed in the base body and acting on the working slide in a direction of displacement by means of a transmission means, wherein the transmission means comprises an output shaft adapted to be rotated concentrically with respect to the base body axis, the output shaft carrying a drive sprocket which meshes with a tooth rack disposed on a side of the working slide and connected to the working slide, wherein the working slide is guided in a prismatic anti-friction guide fixed in the base body and free from play, the anti-friction guide being elastically deformable up to a limit of elastic deformability, and a slideway for the working slide becoming active upon the anti-friction guide reaching the limit of elastic deformability.

36. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, and an adjusting motor disposed in the base body and acting on the working slide in a direction of displacement by means of a transmission means, the tool head including a slide assembly for accepting the working slide, a drive assembly for accepting the adjusting motor and the transmission means, and a connecting assembly comprising the tool shank, the slide assembly and connecting assembly being connected to the drive assembly at axial locations on opposing sides of the drive assembly, wherein the slide assembly comprises a measuring device adapted to directly measure displacement of the working slide with respect to the base body, at least one of the slide assembly and the drive assembly comprise measuring and control electronics connected to the measuring device and controlling the adjusting motor, and the connecting assembly comprises an interface for an inductive power supply and data transmission.

37. A tool head for use in machine tools, comprising a base body, a tool shank adapted to be coupled to a machine spindle and protruding axially over the base body, at least one working slide adapted to be displaced essentially transversely with respect to a base body axis and having a tool holding fixture protruding over a front face thereof, and an adjusting motor disposed in the base body and acting on the working slide in a direction of displacement by means of a transmission means, wherein the adjusting motor is disposed with its rotationally symmetric motor housing in a recess of the base body, the recess being concentric with respect to the base body axis, leaving free a gap space receiving a coolant for cooling the motor.

* * * * *